United States Patent [19]
Bush et al.

[11] Patent Number: 5,864,355
[45] Date of Patent: Jan. 26, 1999

[54] IMAGE FORMING APPARATUS WITH LASER CALIBRATION DURING RAMP-UP PERIOD OF AN OPTICAL DEVICE

[75] Inventors: Craig Palmer Bush; Cyrus Bradford Clarke; David Brian Langer; Phillip Byron Wright, all of Lexington, Ky.

[73] Assignee: Lexmark International, Inc., Lexington, Ky.

[21] Appl. No.: 821,595

[22] Filed: Mar. 20, 1997

[51] Int. Cl.[6] ................................................. G01D 9/42
[52] U.S. Cl. ........................ 347/235; 347/250; 347/133
[58] Field of Search .................. 347/225, 235, 347/236, 246, 248, 250, 253, 133; 250/252.1

[56] References Cited

U.S. PATENT DOCUMENTS

| | | | |
|---|---|---|---|
| 4,023,489 | 5/1977 | Beery | 101/235 |
| 4,333,153 | 6/1982 | Mletzko et al. | 364/926.1 |
| 4,661,861 | 4/1987 | Rutherford et al. | 358/302 |
| 4,765,716 | 8/1988 | Cosgrove et al. | 359/235 |
| 4,868,675 | 9/1989 | Joosten et al. | 358/296 |
| 4,914,455 | 4/1990 | Hayes | 347/131 |
| 4,952,945 | 8/1990 | Hikima | 347/247 |
| 5,018,443 | 5/1991 | Bolger | 101/228 |
| 5,132,980 | 7/1992 | Connors et al. | 372/33 |
| 5,153,745 | 10/1992 | Brandkamp et al. | 358/406 |
| 5,220,348 | 6/1993 | D'Aurelio | 347/236 |
| 5,234,146 | 8/1993 | Meschi | 226/43 |
| 5,258,810 | 11/1993 | Bresina et al. | 399/72 |
| 5,347,298 | 9/1994 | Gokita | 347/133 |
| 5,371,524 | 12/1994 | Herczeg et al. | 347/224 |
| 5,416,504 | 5/1995 | Ohashi | 347/247 |
| 5,450,118 | 9/1995 | Sawada et al. | 347/235 |
| 5,461,414 | 10/1995 | Honda et al. | 347/250 |
| 5,463,410 | 10/1995 | Uchiyama et al. | 347/133 |
| 5,469,203 | 11/1995 | Hauschild | 347/190 |

Primary Examiner—N. Le
Assistant Examiner—Hai C. Pham
Attorney, Agent, or Firm—Ronald K. Aust; John J. McArdle, Jr.

[57] ABSTRACT

The invention is directed to a method of calibrating a laser in an electrophotographic image forming apparatus used for producing a print image on a print medium. A laser having a selectively energizable laser beam output is provided. A rotatable optical device and the laser combine to define a movable projection path of the laser beam output. Rotation of the optical device results in movement of the projection path across a scan line overlaying a photoconductive drum. The optical device has a rotational acceleration upon initial rotation thereof with a ramp-up period during which the rotational velocity increases. A safe area is established in a portion of the scan line which does not overlay an image area on the photoconductive drum. The laser is energized and calibrated when the projection path is positioned in the safe area. The calibration is carried out during the ramp-up period of the rotating optical device.

17 Claims, 4 Drawing Sheets

IMAGE FORMING APPARATUS WITH LASER CALIBRATION DURING RAMP-UP PERIOD OF AN OPTICAL DEVICE

BACKGROUND OF THE INVENTION

1. Field of the Invention

The present invention relates to electrophotographic image forming apparatus using a laser, and, more particularly, to a method of calibrating a laser in such an image forming apparatus.

2. Description of the Related Art

An electrophotographic image forming apparatus including a laser, such as a laser printer, uses an optical system to direct the laser beam output from the laser onto a photoconductive (PC) surface such as a PC drum. The optical system typically includes a plurality of separate optical devices such as flat mirrors, lenses and a rotating polygonal mirror. The laser beam output from the laser is projected at a fixed orientation onto the optical system which then redirects and moves the laser beam to cause the laser beam to scan across the PC drum. More particularly, the polygonal mirror is rotated by an associated motor at a known rotational speed. The laser beam output from the laser is directed onto a surface of the polygonal mirror which in turn redirects the laser beam through appropriate lenses and mirrors onto the PC drum. As the polygonal mirror rotates, the angle of projection between the laser beam which impinges thereon and the laser beam which is projected therefrom changes, thus causing the laser beam to scan across the surface of the PC drum. As the laser beam moves from one surface or facet of the polygonal mirror to an adjacent surface or facet of the polygonal mirror, the laser beam moves from an end of a particular scan line to a beginning of a next scan line.

As resolutions and print speeds of laser printers increase, the rotational speed of the polygonal mirror within the printhead must also increase. Since the polygonal mirror and associated motor have a finite mass, the increase in the rotational speed of the polygonal mirror likewise increases the amount of time it takes for the polygonal mirror and associated motor to ramp-up from a zero rotational speed to a known operating rotational speed. Until the polygonal mirror and motor reach the constant operating rotational speed, printing of the print image on the print medium is not carried out. The period of time between actuation of the motor which drives the polygonal mirror and the actual printing of the print image on the print medium, known as the "first copy time", increases as the operating rotational speed of the polygonal mirror increases.

Another factor which also affects the first copy time of the laser printer is the calibration of the laser which is necessary prior to printing the print image on the print medium. The electrical circuitry associated with the laser typically is configured to provide a signal indicative of the absolute power of the laser when the laser is energized.

In a conventional laser printer, the motor driving the polygonal mirror is operated for a predetermined period of time after initial start-up which allows the operating rotational speed of the polygonal mirror to become relatively constant. Thereafter, the laser is energized for a period of time which is sufficient to allow calibration thereof. Printing on the print medium occurs after the laser is calibrated. A problem with this technique is that the laser calibration occurs after the ramp-up period associated with the rotational speed of the polygonal mirror. The "first copy time" therefore increases as a result of the time required for both ramp-up of the polygonal mirror and calibration of the laser.

Another problem is that calibration of the laser typically has been performed by energizing the laser with disregard to the particular location of the laser beam during a scan of the laser beam across the PC drum. The PC drum is discharged at the locations contacted by the laser beam. As a result, the charged toner particles may be attracted to the PC drum and must be subsequently cleaned from the PC drum prior to printing on the print medium. Moreover, some of the toner particles on the PC drum may be attracted to the transfer roller adjacent to the PC drum. If the transfer roller is not cleaned prior to printing of the print image on the print medium, the toner particles on the transfer roller may be transferred to the back of the print medium and thereby contaminate the print medium.

What is needed in the art is a method of reducing the first copy time of the laser printer.

SUMMARY OF THE INVENTION

The present invention provides a method of printing using a laser printer, wherein the "first copy time" is reduced by initiating scan line synchronization signal generation and/or calibrating the laser concurrently with a ramp-up period of a rotating optical mirror.

The invention comprises, in one form thereof, a method of calibrating a laser in an electrophotographic image forming apparatus used for producing a print image on a print medium. A laser having a selectively energizable laser beam output is provided. A rotatable optical device and the laser combine to define a movable projection path of the laser beam output. Rotation of the optical device results in movement of the projection path across a scan line overlaying a photoconductive drum. The optical device has a rotational acceleration upon initial rotation thereof with a ramp-up period during which the rotational velocity increases. A safe area is established in a portion of the scan line which does not overlay an image area on the photoconductive drum. The laser is energized and calibrated when the projection path is positioned in the safe area. The calibration is carried out during the ramp-up period of the rotating optical device.

An advantage of the present invention is that the laser is calibrated concurrently with the ramp-up period of the rotating optical device, thereby reducing the first copy time of the laser printer.

BRIEF DESCRIPTION OF THE DRAWINGS

The above-mentioned and other features and advantages of this invention, and the manner of attaining them, will become more apparent and the invention will be better understood by reference to the following description of an embodiment of the invention taken in conjunction with the accompanying drawings, wherein.

Corresponding reference characters indicate corresponding parts throughout the several views. The exemplification set out herein illustrates one preferred embodiment of the invention, in one form, and such exemplification is not to be construed as limiting the scope of the invention in any manner.

DETAILED DESCRIPTION OF THE INVENTION

Figure 1:
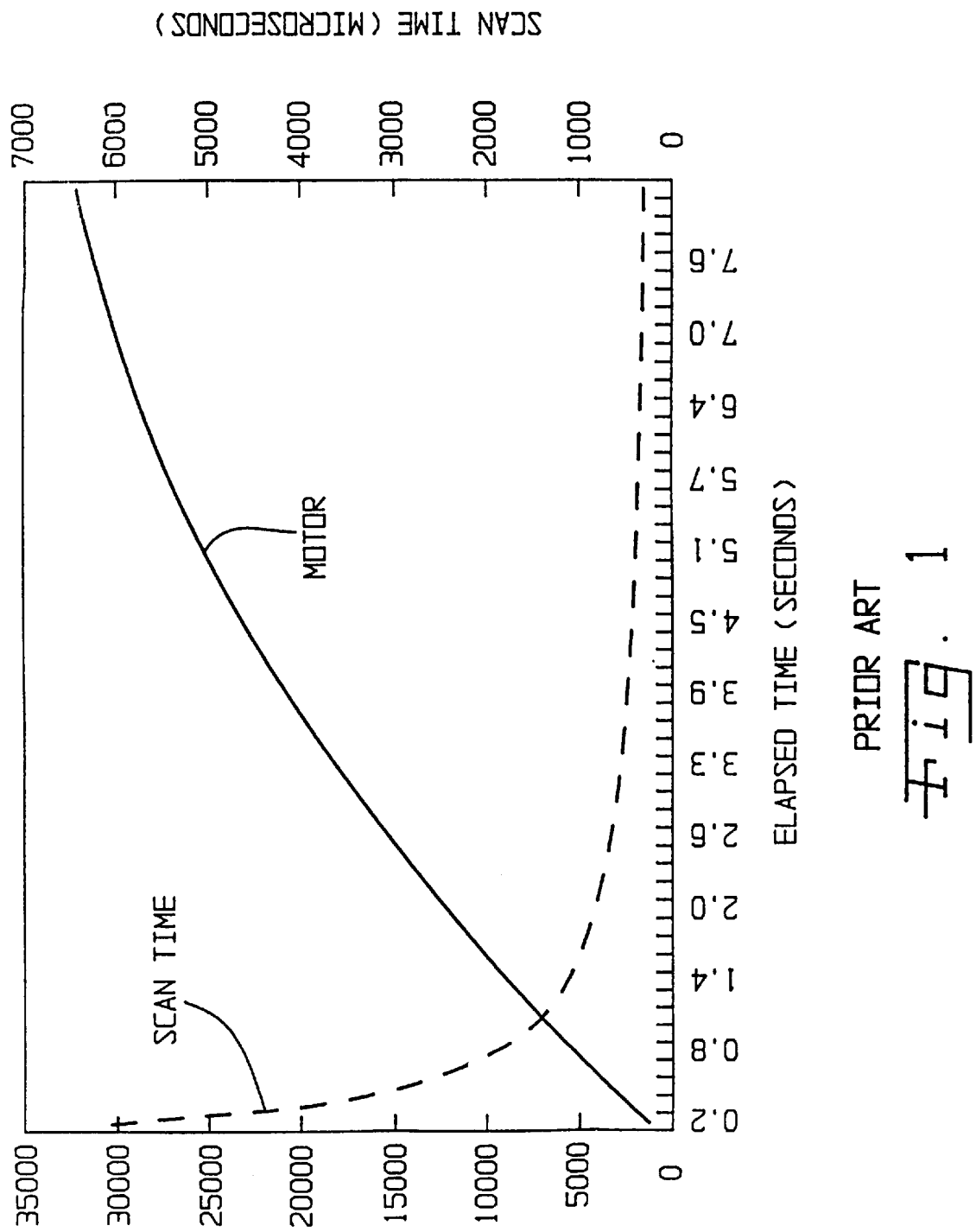
FIG. 1 is a graphical illustration of a ramp-up period of a mirror motor which drives a rotating optical device during initial operation, in comparison with scan times associated with the optical device during the ramp-up period.

Referring now to the drawings and more particularly to FIG. 1, there is shown a graphical illustration of a ramp-up period of a mirror motor which drives a rotating optical device in the form of a polygonal mirror during initial operation, when compared with scan times associated with the polygonal mirror during the ramp-up period. The left vertical axis represents the rotational speed of the motor which drives the polygonal mirror in revolutions per minute. The right vertical axis represents the scan time associated with the driven polygonal mirror in microseconds. In the embodiment shown in FIG. 1, it is assumed that the polygonal mirror has a hexagonal shape with six facets or reflecting surfaces for reflecting the laser beam output from the laser. Upon initial actuation of the motor driving the polygonal mirror (time equals zero), the motor has a rotational speed of zero and a ramp-up speed with a relatively steep slope. After approximately eight seconds from the time of initial actuation of the motor, tile rotational speed of the motor begins to plateau or level off.

Simultaneously with the increasing rotational speed of the motor, the rotational speed of the polygonal mirror driven by the motor also increases. This means that the facets or reflecting surfaces also pass by the laser beam output at a rapidly increasing rate, or velocity. This conversely means that the scan times associated with each of the six facets passing by the laser beam output decrease. At an elapsed time of approximately 0.1 seconds from initial actuation of the mirror motor, the scan time associated with any one particular facet of the polygonal mirror is approximately 6000 microseconds. The scan time subsequently decreases as indicated in FIG. 1. The slope of the scan time is a relatively steep, negative slope upon initial actuation of the mirror motor and begins to plateau or level off around two seconds after initial actuation of the mirror motor. At approximately eight seconds after initial actuation of the mirror motor, the scan time associated with any particular facet on the polygonal mirror is approximately 330 microseconds.

Figure 2:
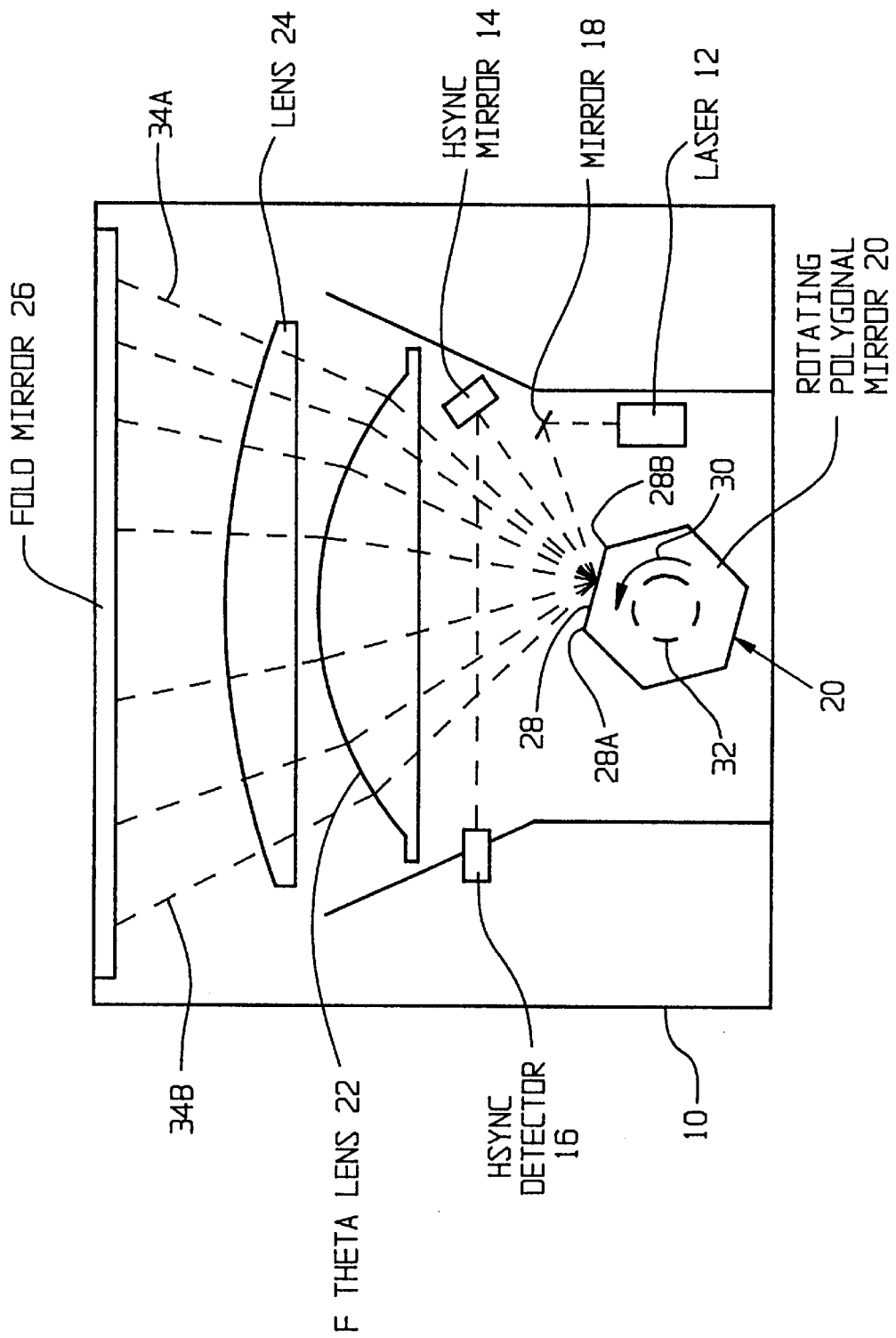
FIG. 2 is a schematic view of an embodiment of a printhead in a laser printer used with the laser calibration method of the present invention.

FIG. 2 is a schematic view of an embodiment of a printhead 10 in a laser printer used with the laser calibration method of the present invention. The various components within FIG. 2 are represented in a simplified, schematic manner since the individual components are of conventional design. Printhead 10 generally includes a laser 12, HSYNC mirror 14, HSYNC detector 16, and an optical system including a mirror 18, rotating polygonal mirror 20, F Theta lens 22, lens 24 and fold mirror 26.

Laser 12 provides a selectively energizable laser beam output at a fixed orientation. The laser beam is reflected from mirror 18 to one of six reflecting surfaces or facets 28 of polygonal mirror 20. Polygonal mirror 20 is driven in a rotational direction (indicated by arrow 30) by a motor shown schematically by dashed line 32. As polygonal mirror 20 rotates, the angular position of facet 28 changes relative to the laser beam reflected from mirror 18. The change in angular position of facet 28 in turn causes the projection path of the laser beam to scan across fold mirror 26. A laser beam reflected from facet 28 near leading edge 28A corresponds to a projection path 34A at a beginning of a scan line, and a laser beam reflected from facet 28 near trailing edge 28B corresponds to a projection path 34B at an end of a scan line. F Theta lens 22 and lens 24 are refractive type lenses which redirect and/or alter the light characteristics of the laser beam in a known manner. Fold mirror 26 folds the laser beam reflected thereon at substantially a right angle relative to the drawing page of FIG. 2 and onto a PC drum (not shown in FIG. 2). The width of the scan line projected by fold mirror 26 is wider than the width of the PC drum, as will be described in more detail hereinafter.

For purposes of illustration and description, it is assumed that the projection paths of the laser beam emitted from laser 12 are existent regardless of whether the laser beam is actually emitted from laser 12. That is, laser 12 is selectively energizable to produce an intermittent laser beam output as indicated above. The laser beam is only actuated at a plurality of locations within a particular scan line corresponding to locations on the PC drum which are to be discharged for attracting the charged toner particles. The projection path of the laser beam output from laser 12 is thus defined as a theoretical projection path of the laser beam at any particular point across the scan line dependent upon the orientation of the reflecting facet 28, regardless of whether the laser beam output is actually emitted from laser 12.

HSYNC mirror 14 reflects the laser beam from laser 12 when the laser beam impinges upon facet 28 at the leading edge 28A. The laser beam reflected from HSYNC mirror 14 impinges upon an HSYNC detector 16 which provides an output HSYNC signal indicating that the beginning of a next scan line has occurred. The output signal from HSYNC detector 16 is used for horizontal synchronization by the laser printer for proper alignment of the print data across the particular scan line. As polygonal mirror 20 rotates, the leading edge of each facet 28 reflects a laser beam to HSYNC mirror 14 to indicate the beginning of an associated next scan line.

With conventional laser printers, mirror motor 32 is actuated to rotatably drive polygonal mirror 20. Motor 32 is operated for a predetermined period of time allowing the rotational speed thereof to ramp-up and level off at a desired operating speed. Thereafter, laser 12 is energized for a specified amount of time allowing calibration thereof by measuring the power output therefrom. When laser 12 is energized, no attention is given to the projection path 34A–34B of the laser beam output. The laser beam output thus is reflected from fold mirror 26 and impinges upon the PC drum. This causes the PC drum to be discharged at the impingement locations of the laser beam, which in turn may attract charged toner particles to the PC drum. These toner particles may in turn be transferred to an adjacent transfer roller. It is thus necessary to clean both the PC drum and the transfer roller prior to printing on a print medium to prevent the formation of ghost images on the print medium. This unnecessary discharging of the PC drum requires additional time for cleaning of the PC drum and/or transfer roller, and may result in the formation of undesired images on the print medium.

Figure 3:
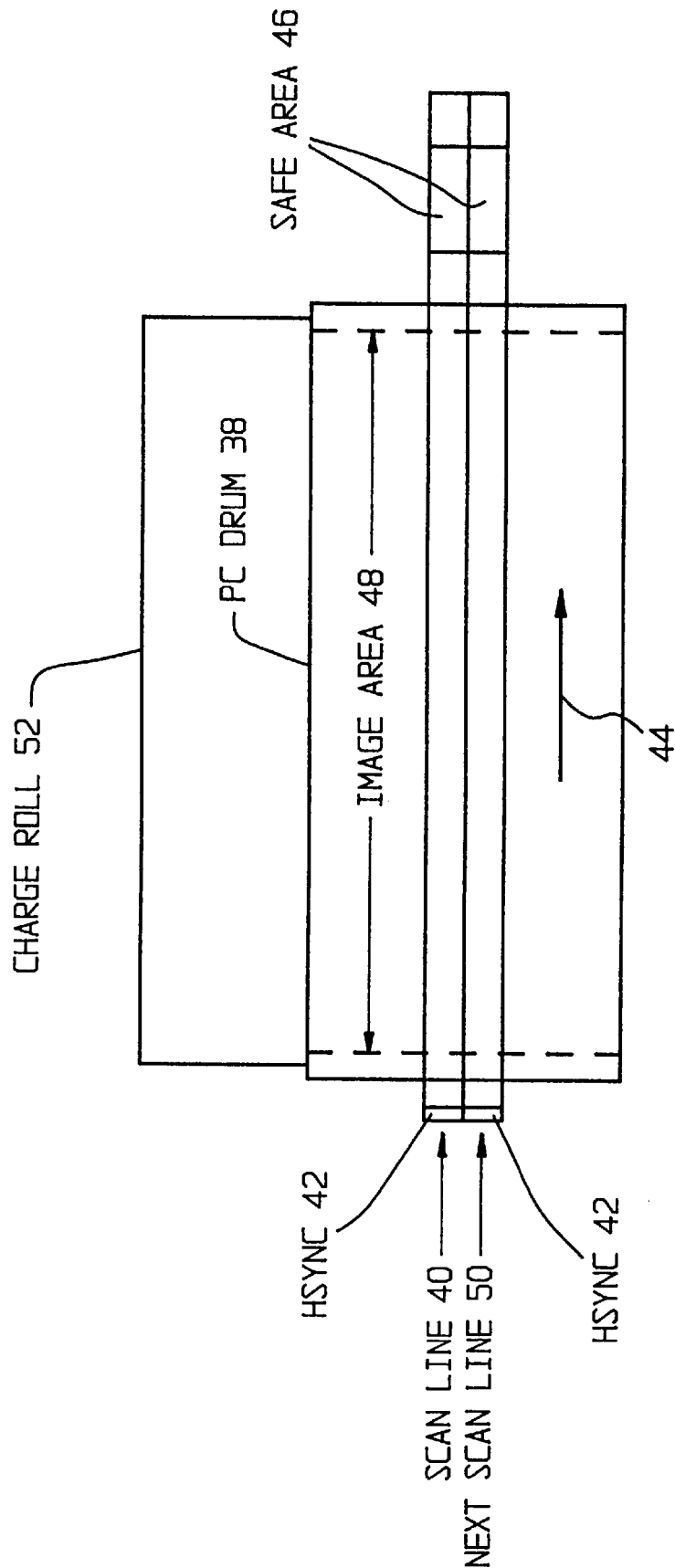
FIG. 3 is a schematic view illustrating successive scans of the printhead in relation to a PC drum when the laser is calibrated in accordance with an embodiment of the method of the present invention.
Figure 4:
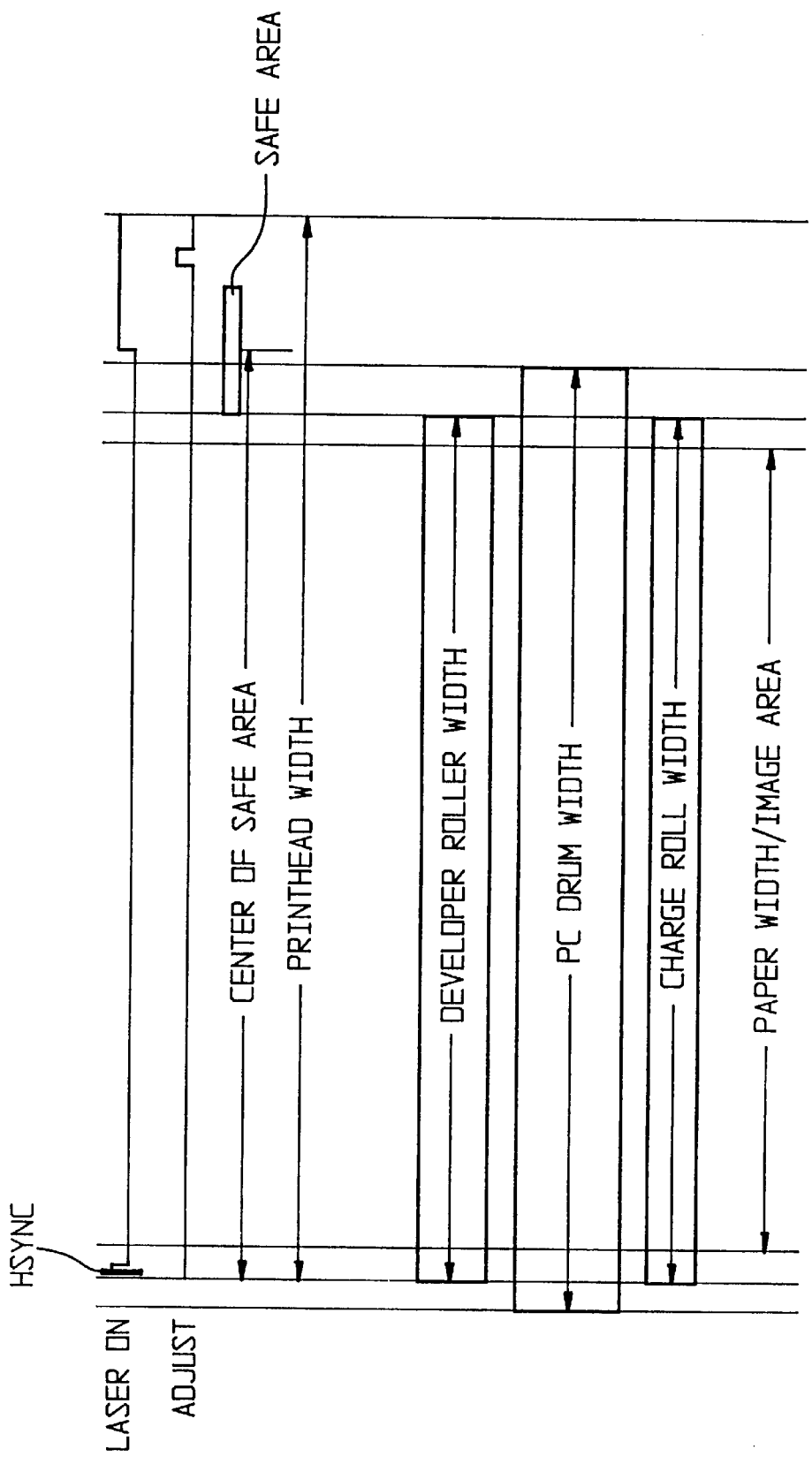
FIG. 4 is a graphical illustration of distances associated with various mechanical components in the laser printer, in relation to scan distances associated with a particular scan of the printhead during calibration of the laser.

Referring now to FIGS. 3 and 4, an embodiment of the method of the present invention for calibrating the laser and reducing the first copy time of the laser printer will be described in more detail. FIG. 3 is a schematic view illustrating successive scans of printhead 10 in relation to a PC drum 38 when laser 12 is calibrated in accordance with an embodiment of the method of the present invention. Scan line 40 corresponds to a particular scan of the laser beam output from laser 12 across the plurality of projection paths ranging from the beginning projection path 34A to ending projection path 34B (FIG. 2), regardless of whether laser 12 is actually energized to provide the laser beam output. At the beginning of scan line 40, HSYNC detector 16 provides an HSYNC signal 42 used for horizontal synchronization of the print data relative to the print image to be printed. The laser beam output from laser 12 must be ON for detection by HSYNC detector 16. The laser beam output from laser 12 is thereafter preferably de-energized as the scan proceeds in scanning direction 44 until the projection path of the laser beam is within a safe area 46 outside image area 48. The laser beam output from laser 12 is energized within safe area 46 and remains ON until detected by HSYNC detector 16 at the beginning of a next scan line 50, at which point an HSYNC signal 42 is provided by HSYNC detector 16 and the laser beam output from laser 12 is again turned OFF. After laser 12 is turned ON when the projection path is within safe area 46, laser 12 is calibrated by measuring the power output therefrom. This method of energizing laser 12 when the projection path is within safe area 46, calibrating laser 12 while energized, and de-energizing laser 12 upon detection by HSYNC detector 16 repeatedly occurs until the rotational speed of polygonal mirror 20 has ramped-up to a substantially constant operating speed after initial start up, and continues during the printing operation.

As is apparent from FIG. 3, laser 12 is not energized when the projection path of the laser beam output overlies image area 48. Thus, no undesirable images are formed on the print medium since the PC drum 38 is discharged by the front end of the laser calibration sequence during the early portion of the print cycle, where the EP process is already in a cleaning mode.

Charge roll 52 is disposed adjacent to PC drum 38 and charges the surface of PC drum 38 for subsequent discharging by the laser beam output from laser 12. Charge roll 52 is wider than image area 48, but narrower than PC drum 38. The portion of PC drum 38 which is wider than charge roll 52 is not charged by charge roll 52 and thus is not affected by the impingement of the laser beam output thereon. Accordingly, it is preferable that safe area 46 be positioned within the plurality of scan lines, such as scan lines 40 and 50, such that safe area 46 is positioned outside the width of charge roll 52. Safe areas 46 may also be positioned so as to not overlay PC drum 38 as shown in FIG. 3.

Referring now to FIG. 4, the spatial relationships between various physical components of the laser printer and calibration of the laser will be described in more detail.

The width of various components within the laser printer are shown in proportional relationship to each other at the bottom of FIG. 4. The developer roller and the charge roll have a width which is approximately equal to each other. The PC drum has a width which is larger than the width of each of the developer roller and the charge roll. The actual image area on the PC drum is narrower than the charge roll and generally corresponds to the width of the paper or other print medium. The printhead width corresponds to the total width of the scan line produced by printhead 10, which generally extends from a beginning projection path 34A to an ending projection path 34B shown in FIG. 2. The printhead width is a function of the distance across each facet 28 of polygonal mirror 20 from a leading edge 28A to a trailing edge 28B, as well as the deflection angles of the various projection paths of the laser beam through lenses 22 and 24.

As indicated by the line labeled "LASER ON", laser 12 is energized at a portion of the scan line which coincides with safe area 46. In the embodiment shown, laser 12 is energized at approximately the center of safe area 46, thus allowing a margin of error in either direction. Safe area 46 is disposed at the end of a scan line and outside of the width of the charge roll, as described above and indicated in FIG. 4. Safe area 46 is positioned far enough away from the end of the scan line such that the laser may be energized for a sufficient amount of time allowing the power output to be determined and calibrated. After laser 12 has been energized for a sufficient amount of time allowing the power output to be determined, laser 12 is calibrated by adjusting the power output, as indicated by the line labeled "ADJUST". The laser beam output from laser 12 remains energized until HSYNC detector 16 detects the beginning of a next scan line and provides a corresponding HSYNC signal 42. Immediately thereafter, the laser beam output is de-energized prior to the projection path of the next scan line impinging upon the image area on the PC drum. The laser beam output is preferably de-energized as close to the HSYNC signal 42 as possible.

The method of energizing the laser beam output from laser 12 within safe area 46 will now be described in more detail. As shown in FIG. 1, the scan time of printhead 10 rapidly decreases during the ramp-up period after initial actuation of mirror motor 32. The safe area 46 is positioned within the scan line and outside of the charge roll width, as indicated in FIG. 4. The center of safe area 46 is thus at a predetermined distance from the beginning of a particular scan line. Likewise, the center of safe area 46 may be represented within a particular scan line by the ratio of the distance from the beginning of the scan line to the center of safe area 46, divided by the total printhead width. As the rotational speed of polygonal mirror 20 ramps up after initial actuation of mirror motor 32, the scan time for a particular scan line may be determined by sensing the time duration between HSYNC signals 42 provided by HSYNC detector 16. The laser printer includes an on-board clock, or timer, (not shown) which may be used for determining the time between HSYNC signals 42. As an approximation of the scan time for a particular scan line, the time between the HSYNC signals for a specified number of previous scan lines may be utilized. For example, it is possible to average the scan times for the previous two (or more) scan lines together as an estimation of the scan time for a next scan line upon receipt of the HSYNC signal 42 corresponding to the next scan line. The estimated scan time can then be multiplied times the ratio or weighting factor represented by the quotient of the distance from the beginning of the scan line to the center of safe area 46, divided by the total width of the next scan line, i.e., printhead width. After a period of time has elapsed from detection of HSYNC signal 42 corresponding to this weighted scan time, laser 12 is energized to produce the laser beam output at approximately the center of safe area 46. Laser 12 then remains energized until HSYNC detector 16 senses the beginning of a next scan line and provides an HSYNC signal 42.

Upon initial actuation of mirror motor 32, it is necessary for laser 12 to be energized and remain in an energized state until HSYNC detector 16 has provided at least two HSYNC signals. This allows the position of the projection path from laser 12 to be determined.

In one embodiment of the method of the present invention, the time from the beginning of a scan line until the laser is energized at the center of the safe area 46 is calculated using the following formula:

$$\text{HSYNC to Laser ON} = \left[\frac{\text{Captured Time}}{\text{\# HSYNCS Captured}}\right]\left[\frac{\text{HSYNC to Center of Safe area (mm)}}{\text{Printhead Width (mm)}}\right]$$

Where,
captured time=total time over the number of HSYNCS to be averaged;
HSYNCS captured=number of HSYNCS sensed during the captured time (set to 2 in this embodiment);
HSYNC to center of safe area=distance from the beginning of a scan line to the center of safe area 46; and
printhead width=total width of any one of the scan lines.
This mathematical formula can be further manipulated dependent upon the particular electrical hardware utilized to carry out the computation. For example, if the microcontroller is in the form of Applications Specific Integrated Circuitry (ASIC), the ASIC registers may be PEL based. The captured time may be converted into PELS by correlating the number of slices per PEL and the time per slice.

In the embodiment of the method of the present invention described above, the scan time for a particular scan line is estimated using an average scan time for a predetermined number of previous scan lines. However, it is also possible to extrapolate an estimated scan time based upon previous scan times. For example, the HSYNC signals provided by HSYNC detector 16 may be used to determine the acceleration of polygonal mirror 20 driven by mirror motor 32. An extrapolated scan time for a next scan line can be calculated using a linear, least squares or other known data fitting algorithm. Moreover, since the polygonal mirror 20 includes a predetermined number of facets, the acceleration of polygonal mirror 20 can be used to determine the position of a projected path of the laser beam onto a facet 28 using integration techniques.

The calculation set forth above may be performed either in real time, or precalculated and converted into a look-up table which may be indexed by the measured HSYNC time.

While this invention has been described as having a preferred design, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A method of calibrating a laser in an electrophotographic image forming apparatus used for producing a print image on a print medium, said method comprising the steps of:

providing a laser having a selectively energizable laser beam output;

rotating an optical device, said optical device and said laser combining to define a movable projection path of said laser beam output, wherein said rotation of said optical device results in said movement of said projection path across a scan line overlaying a photoconductive surface, said rotating step including a ramp-up period upon initial rotation of said optical device during which a rotational velocity of said optical device increases;

establishing a safe area in a portion of said scan line which does not overlay an image area on said photoconductive surface; and energizing and calibrating said laser when said projection path is positioned in said safe area, said energizing and calibrating step being carried out during said ramp-up period of said rotating step.

2. The method of claim 1, wherein said photoconductive surface comprises a photoconductive drum, and comprising the further step of providing a charge roll adjacent said photoconductive drum, and wherein said establishing step comprises establishing a safe area in a portion of said scan line which does not overlay said charge roll.

3. The method of claim 2, wherein said safe area is located at an end of said scan line, relative to a scanning direction.

4. The method of claim 2, comprising the further steps, carried out after said energizing and calibrating step, of sensing said energized laser beam output and providing a synchronization signal, HSYNC, corresponding thereto, and wherein said rotation of said optical device results in said movement of said projection path across a next scan line overlaying said photoconductive surface, said synchronization signal being used by said image forming apparatus during said movement of said projection path across said next scan line.

5. The method of claim 4, wherein said sensing step is carried out when said projection path is at a beginning of said next scan line, relative to a scanning direction, and comprising the further step of de-energizing said laser immediately after said sensing step.

6. The method of claim 5, wherein said sensing step is carried out using a photodetector.

7. The method of claim 4, wherein said rotating step is carried out using a motor attached to said optical device, and comprising the further step of determining a rotational velocity of said motor using said synchronization signal.

8. The method of claim 4, wherein said establishing step comprises determining an estimated total scan time for said movement of said projection path across said scan line, said safe area corresponding to a segment of said total scan time.

9. The method of claim 8, wherein said segment of said total scan time corresponds to an end of said scan line, relative to a scanning direction.

10. The method of claim 9, wherein said safe area is established by calculating a time from a beginning of said scan line until said laser is energized at a center of said safe area, said calculating substep using a mathematical relationship:

$$\text{HSYNC to Laser ON} = \left[\frac{\text{Captured Time}}{\text{\# HSYNCS Captured}}\right]\left[\frac{\text{HSYNC to Center of Safe area (mm)}}{\text{Printhead Width (mm)}}\right]$$

wherein,
captured time=total time over number of HSYNCS to be averaged;
HSYNCS captured=number of HSYNCS sensed during the captured time;
HSYNC to center of safe area=distance from the beginning of a scan line to the center of safe area; and
printhead width=total width of any one of the scan lines.

11. The method of claim 1, wherein said energizing and calibrating step is carried out when said projection path is positioned approximately at a center of said safe area.

12. The method of claim 1, wherein said photoconductive surface comprises a photoconductive drum.

13. The method of claim 1, wherein said calibrating step comprises determining a power output level from said laser.

14. The method of claim 1, wherein said optical device comprises a polygonal mirror.

15. A method of calibrating a laser in an electrophotographic image forming apparatus used for producing a print image on a print medium, said method comprising the steps of:

provideing a laser having a selectively energizable laser beam output;

rotating an optical device, said optical device and said laser combining to define a movable projection path of said laser beam output, wherein said rotation of said optical device results in said movement of said projection path across a scan line overlying a photoconductive surface, said rotating step including a ramp-up period upon initial rotation of said optical device during which a rotational velocity of said optical device increases;

establishing a safe area in a portion of said scan line which does not overlag an image area on said photoconductive surface, said establishing step comprising the substeps of:

determining an estimated total scan time for said movement of said projection path across said scan line, said safe area corresponding to a segment of said total scan time corresponding to an end of said scan line, relative to a scanning direction; and multiplying said total scan time with a weighting factor; and energizing and calibrating said laser when said projection path is positioned in said safe area, said energizing and calibrating step being carried out during said ramp-up period of said rotating step.

16. The method of claim 15, wherein said weighting factor comprises a ratio represented by a quotient of a distance from a beginning of said scan line to a center of said safe area, divided by a total width of said scan line.

17. A method of initializing a laser in an electrophotographic image forming apparatus used for producing a print image on a print medium, said method comprising the steps of:

providing a laser having a selectively energizable laser beam output;

rotating an optical device, said optical device and said laser combining to define a movable projection path of said laser beam output, wherein said rotation of said optical device results in said movement of said projection path across a scan line overlaying a photoconductive surface, said rotating step including a ramp-up period upon initial rotation of said optical device during which a rotational velocity of said optical device increases;

establishing a safe area in a portion of said scan line which does not overlay an image area on said photoconductive surface; and generating a scan line synchronization signal when said projection path is positioned in said safe area, said generating step being carried out during said ramp-up period of said rotating step.

* * * * *